US007401266B1

(12) United States Patent
LaMan, III

(10) Patent No.: US 7,401,266 B1
(45) Date of Patent: *Jul. 15, 2008

(54) SYSTEM AND METHOD FOR HANDLING ERRORS IN ACCORDANCE WITH A RISK SCORE FACTOR

(75) Inventor: Arthur E. LaMan, III, Hopedale, MA (US)

(73) Assignee: EMC Corporation, Hopkinton, MA (US)

( * ) Notice: Subject to any disclaimer, the term of this patent is extended or adjusted under 35 U.S.C. 154(b) by 504 days.

This patent is subject to a terminal disclaimer.

(21) Appl. No.: 11/022,530

(22) Filed: Dec. 22, 2004

(51) Int. Cl.
*G06F 11/00* (2006.01)

(52) U.S. Cl. ........................... 714/48; 714/26; 709/223; 709/224

(58) Field of Classification Search .................. 714/48, 714/26
See application file for complete search history.

(56) References Cited

U.S. PATENT DOCUMENTS

| | | | | |
|---|---|---|---|---|
| 6,032,184 | A * | 2/2000 | Cogger et al. | 709/223 |
| 6,625,750 | B1 * | 9/2003 | Duso et al. | 714/11 |
| 2003/0007627 | A1 * | 1/2003 | Elsey et al. | 379/265.01 |
| 2004/0184593 | A1 * | 9/2004 | Elsey et al. | 379/218.01 |
| 2005/0096953 | A1 * | 5/2005 | Washington et al. | 705/7 |

* cited by examiner

*Primary Examiner*—Emerson C Puente
(74) *Attorney, Agent, or Firm*—Krishnendu Gupta; Robert Kevin Perkins

(57) ABSTRACT

A system and method that includes scoring logic for handling errors in a data storage environment by employing risk scoring. Architecture for handling errors with scoring logic is provided. A program product enabled for carrying out methodology described herein is also provided. An apparatus for handling errors using risk scoring is provided.

11 Claims, 10 Drawing Sheets

SYSTEM AND METHOD FOR HANDLING ERRORS IN ACCORDANCE WITH A RISK SCORE FACTOR

A portion of the disclosure of this patent document contains command formats and other computer language listings, all of which are subject to copyright protection. The copyright owner, EMC Corporation, has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention relates generally to error detection and correction of errors in a data storage environment, and more particularly to a system and method for augmenting and simplifying the task of service professionals who handle such errors for data storage systems.

RELATED CASES

This application is a related to co-pending U.S. patent application Ser. No. 11/022,211 entitled "Architecture for Handling Errors in Accordance with a Risk Score Factor" by Arthur E. Laman, III filed on even date with this application, and is assigned to EMC Corporation, the same assignee as this invention.

BACKGROUND OF THE INVENTION

As is known in the art, computer systems generally include a central processing unit (CPU), a memory subsystem, and a data storage subsystem. According to a network or enterprise model of the computer system, the data storage system associated with or in addition to a local computer system, may include a large number of independent storage devices or disks housed in a single enclosure or cabinet. This array of storage devices is typically connected to several computers over a network or via dedicated cabling. Such a model allows for the centralization of data that is to be shared among many users and also allows for a single point of maintenance for the storage functions associated with the many host processors.

The data storage system stores critical information for an enterprise that must be available for use substantially all of the time. If an error occurs on such a data storage system it must be fixed as soon as possible because such information is at the heart of the commercial operations of many major businesses. A recent economic survey from the University of Minnesota and known as Bush-Kugel study indicates a pattern that after just a few days (2 to 6) without access to their critical data many businesses are devastated. The survey showed that 25% of such businesses were immediately bankrupt after such a critical interruption and less than 7% remained in the marketplace after 5 years.

Recent innovations by EMC Corporation of Hopkinton, Mass. provide business continuity solutions that are at the heart of many enterprises data storage infrastructure. Nevertheless, the systems (including devices and software) being implemented are complex and vulnerable to errors that must be quickly serviced for the continuity to be maintained.

EMC has been using a technique for responding to errors as they occur by "calling home" to report the errors. The data storage system is equipped with a modem and a service processor (typically a laptop computer) for error response. Sensors that are built into its storage systems monitor things such as temperature, vibration, and tiny fluctuations in power, as well as unusual patterns in the way data is being stored and retrieved—over 1,000 diagnostics in all. Periodically (about every two hours), an EMC data storage system checks its own state of health. If an error is noted, a machine-implemented "call home" is made to customer service over a line dedicated for that purpose. Every day, thousands of such calls home for help reach EMC's customer service center in Hopkinton. About one-third of the calls from EMC's machines trigger the dispatch of a customer engineer to fix some problem, but clearly not all calls can be handled right away. Nor are all errors necessarily caught by the reporting system. At risk is the data storage system owner's data, but even when not at risk, if the owner is dissatisfied with how long it is taking to get the problem resolved then that reflects poorly on the company that sold the data storage system to the owner.

Companies that sell data storage systems are very concerned with protecting the customer's data and with the customer's satisfaction with the overall ownership experience because they would like to have a mutually satisfactory business relationship. But the volume of calls and errors in general and the overall complexity of problems make it extremely difficult to have quick resolutions. But rushing to fix every problem as it comes in stretches resources undesirably and is costly.

What is needed is a way to handle errors and service problems in a way that fixes the problem in a reasonably timely fashion while ensuring that the owner stays satisfied with the experience.

SUMMARY OF THE INVENTION

The present invention in one embodiment is a system and method that includes scoring logic for handling errors in a data storage environment by employing risk scoring. In another embodiment, architecture for handling errors with scoring logic is provided. In yet another embodiment, a program product enabled for carrying out methodology described herein is also provided. In still another embodiment an apparatus for handling errors using risk scoring is provided.

BRIEF DESCRIPTION OF THE DRAWINGS

The above and further advantages of the present invention may be better under stood by referring to the following description taken into conjunction with the accompanying drawings in which.

DETAILED DESCRIPTION OF THE PREFERRED EMBODIMENT

The methods and apparatus of the present invention are intended for use in data storage systems, such as the Symmetrix Integrated Cache Disk Array system available from EMC Corporation of Hopkinton, Mass. and in particular are useful for managing errors that may occur on such a system.

The methods and apparatus of this invention may take the form, at least partially, of program code (i.e., instructions) embodied in tangible media, such as floppy diskettes, are the CD-ROMs, hard drives, random access or read only-memory, or any other machine-readable storage medium. When the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission. And may be implemented such that herein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Figure 1:
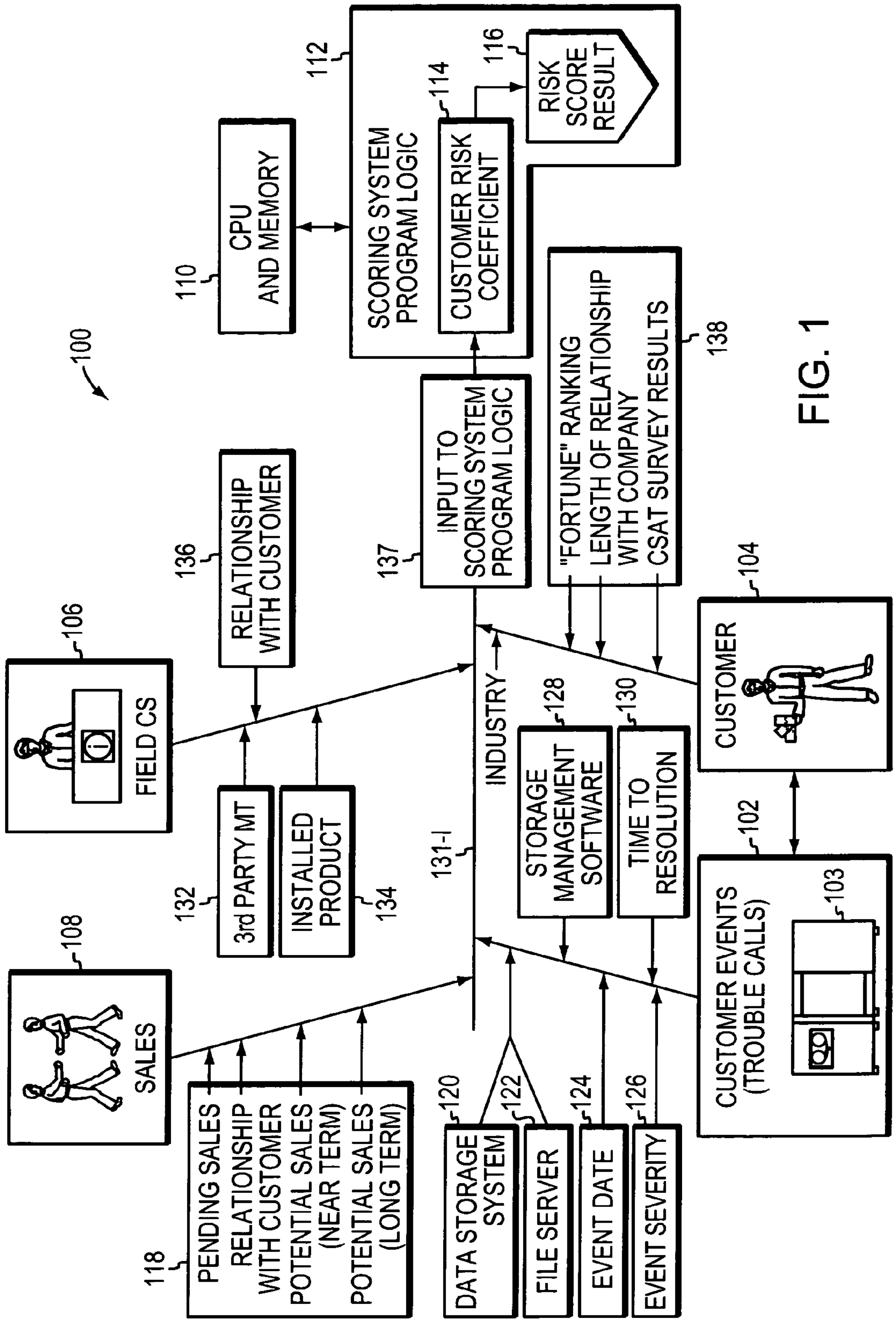
FIG. 1 is a block diagram of a data storage environment with program logic for a customer experience management system embodiment of this invention.
Figure 2:
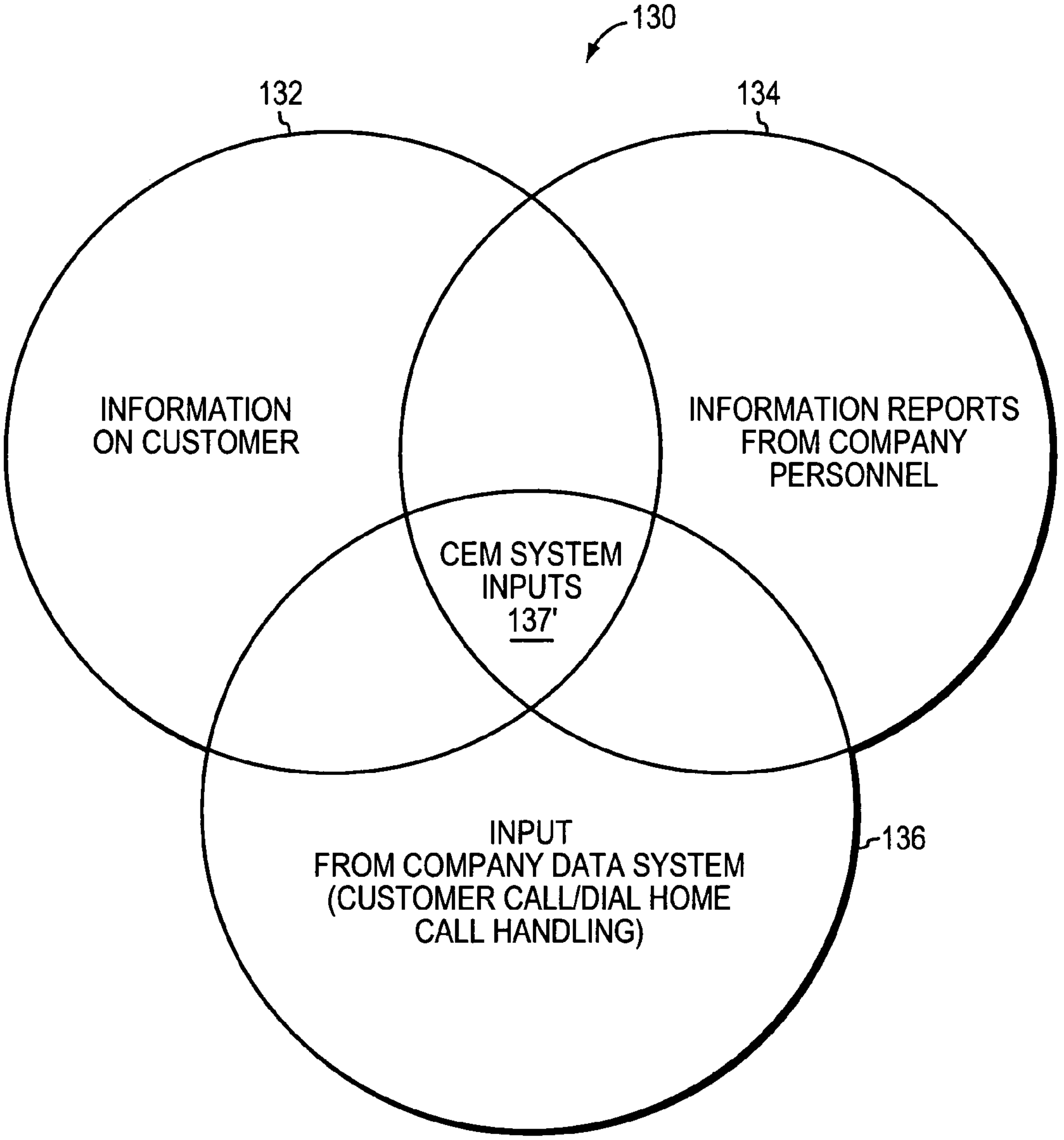
FIG. 2 is a schematic of information handled by the customer experience management system program logic FIG. 1.

The logic for carrying out the method is embodied as part of a Data Storage Environment including architecture 100 denoted as a customer experience management (CEM) system that is described below beginning with reference to FIGS. 1-3, and which is useful for implementing a method described with reference to FIGS. 5-9. For purposes of illustrating the present invention, the invention is described as embodied in a specific configuration, but one skilled in the art will appreciate that the device is not limited to the specific configuration but rather only by the claims included with this specification Referring now to FIG. 1, architecture 100 may include a data storage system 120 that in a preferred embodiment is a Symmetrix Integrated Cache Disk Arrays system available from EMC Corporation of Hopkinton, Mass. or a Clariion Data Storage System also available from EMC. Such data storage systems and their implementations are fully described in U.S. Pat. No. 6,101,497 issued Aug. 8, 2000, and also in U.S. Pat. No. 5,206,939 issued Apr. 27, 1993, each of which is assigned to EMC the assignee of this invention and each of which is hereby incorporated by reference. Consequently, the following discussion makes only general references to the operation of such systems. The invention is useful for handling errors which may occur on such a data storage system or a file server 122, which may be in a preferred embodiment a Celerra File Server available from EMC. Such errors are also referred to as customer events or trouble calls 102 and represent an information entity handled initially by an information system 103, which in a preferred embodiment is the Clarify system used by EMC (Clarify is available from Clarify Incorporated).

In typical prior art environments not including embodiments of this invention, such customer events are handled by field customer service (CS) 106, but the inventor has critically recognized that there is a repercussive effect set off by customer events. Moreover, the inventor has also critically recognized that there any many variables to consider when managing such events and the repercussive effects may be managed by integrating the variables to achieve a risk score result 116 achieved by scoring system program logic 112 including a customer risk coefficient 114. Such risk management is an achievement and advantage of the invention. When the logic 112 is executed by CPU and memory combination in a general purpose digital computer 110 the logic and computer 110 become a special purpose apparatus for carrying out methodology described herein.

Figure 3:
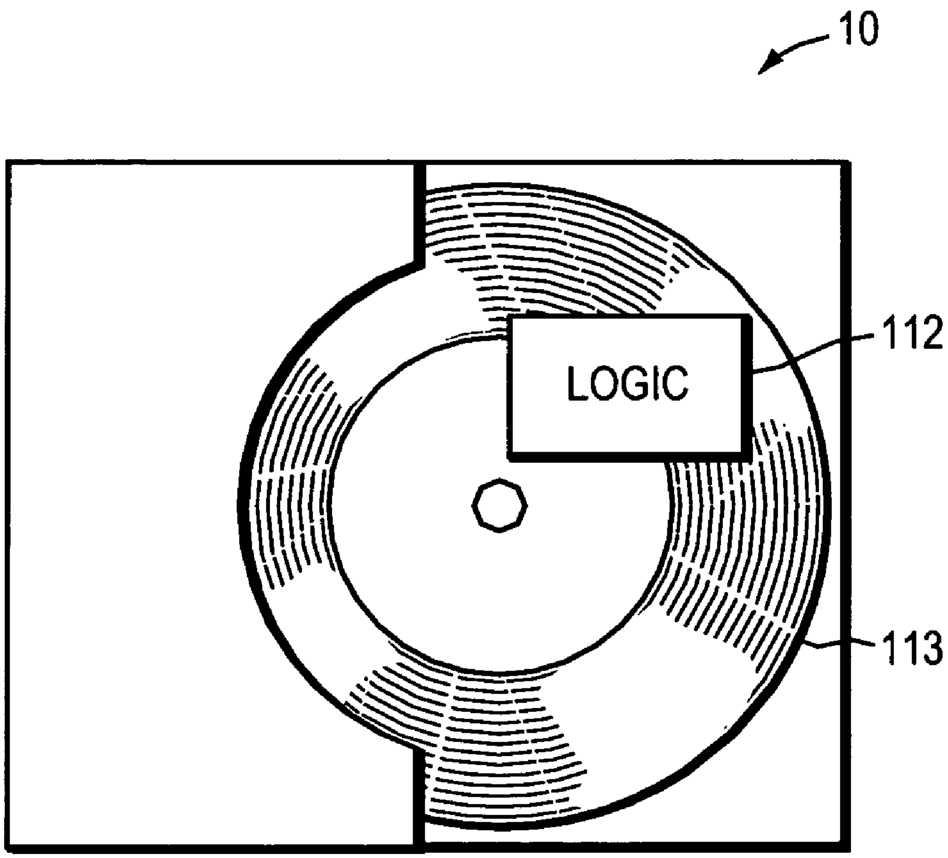
FIG. 3 is a computer data storage medium encoded with the program logic of FIG. 1 for carrying out methodology described herein.

Referring to FIG. 3, another embodiment of the invention is shown wherein Program Product 10 includes a computer-readable medium 113 having program logic 112 encoded thereon. When executed in a computer's memory by a processing unit, the logic reconfigures a general purpose digital computer into a special purpose digital computer enabled for carrying out the process and methodology discussed herein. Reference is made below to FIGS. 1 and 2. Referring again to FIG. 1, the program logic 112 receives input 137 that the inventor has recognized is helpful for arriving at the risk score result 116 and which helps form the customer risk coefficient 114. Referring to FIG. 2, the inventor's recognition of important information is shown by a schematic of its relationship, here represented by a Venn-diagram 130. The inventor has recognized that there exists information on a customer information set 132, information reports from company personnel information set 134 (company is the entity ultimately responsible for customer's satisfaction, and may be the seller of a data storage system or file server in the data storage environment). There is also input from the company data system 103 through means such as customer calls, dial home mechanisms, and call handling all shown in information set 136. The overlap of such information is what is input for the logic, shown diagrammatically as customer system input sets 137'.

Referring to FIG. 1 again after trouble calls originate shown in information block 102, there is a direct impact on customer 104. Information generated includes event date 124 and event severity 126. For example, an outage of a critical element such as a data storage device may be highly severe or not as severe depending on factors such as whether another device can be substituted for it that has the same data on it. Event severity coding is part of the normal Clarify system, but is used in new and unobvious ways by the logic of this invention. Storage Management software 128, such as the preferred EMC ControlCenter family of software products may also used for formulating inputs to the logic. Time to resolution 130 is also an important piece of information that directly impacts customer's satisfaction with the error handling and ultimately the company's products, such at the data storage system 120.

Referring again to FIG. 1, Company's Sales organization represented as entity 108 has critical information on the customer that is typically only managed in an ad-hoc fashion by prior art error handling schemes. Examples of information that Sales may provide is shown in information block 118. Such information includes information about pending sales, potential sales (near and long term), and the overall quality and financial value of the relationship with customer. Input 137 may include such information which is used by the logic as described herein. Customer service also has a relationship with the customer and can provide information, examples of which are shown in information block 136. This information is assimilated by the logic when received as input to achieve increased customer satisfaction (discussed in more detail in FIG. 4). Customer service may receive information from a 3$^{rd}$ party maintainer (MT) represented in information block 132, or may have information about the installed product 134, all of which may also be used to achieve a risk score result.

Certain industry information may also be used for input 137 and is shown in industry information block 138, and which may include the customer's "Fortune" Ranking (i.e., it's ranking by Fortune Magazine in its famous Fortune 500 rank of industry leaders), the length of relationship with the Company, and customer satisfaction survey (CSAT) results. All of these inputs are fed into input data path 131-I, through the input 137 and to the logic 112 in order to derive the risk score result for handling the error with the ultimate goal of increasing customer satisfaction.

Figure 10:
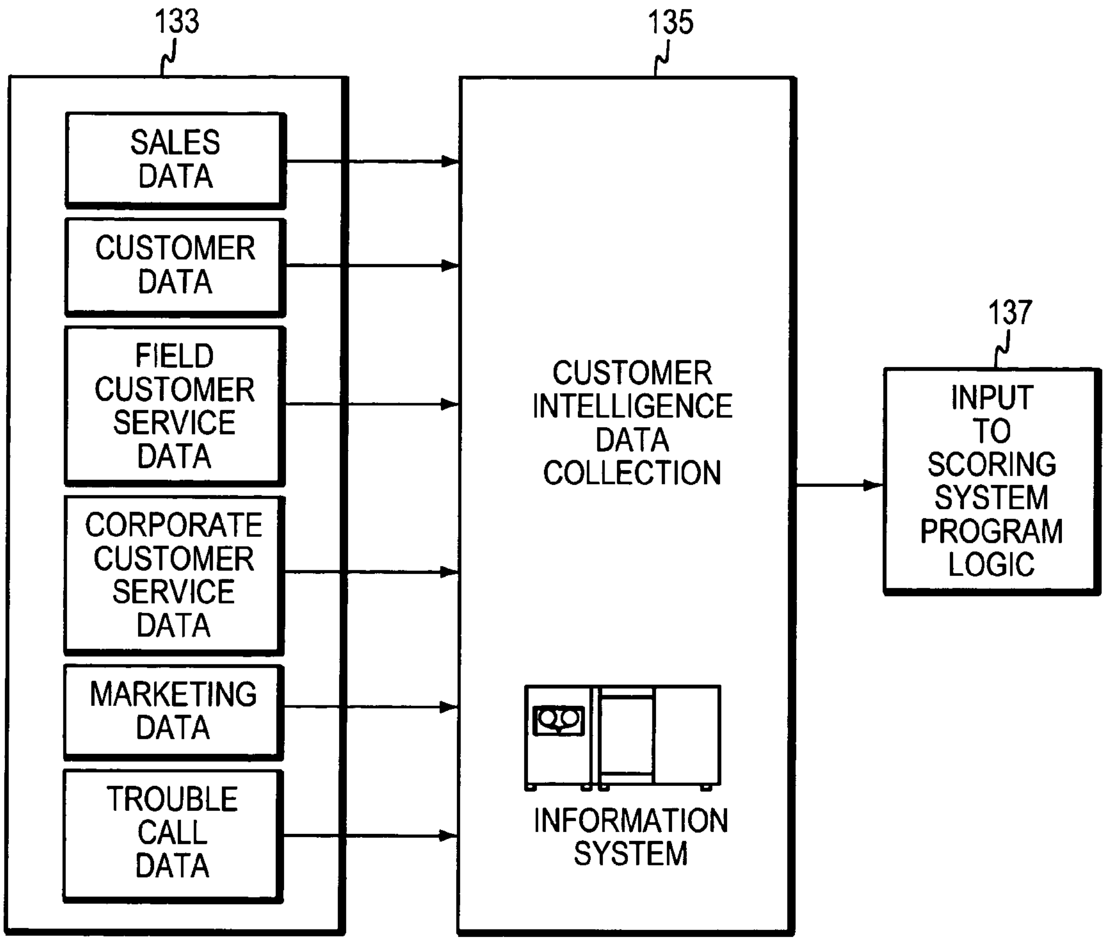
FIG. 10 is an embodiment of a customer management system for giving inputs to the program logic of FIGS. 1 and 3.

An overview of the formation of input 137 is shown in FIG. 10 in summary form. Information entities 133 and fed to customer intelligence data collection 135 including an information system and then to the input to the scoring system program logic 137. The information includes sales data, customer data, field customer service data, corporate customer service data, marketing data, and trouble call data. In order to help to manage the customer experience in an efficacious manner, the Customer Experience Management System 100 takes inputs from all available knowledge sources, some examples of which have been discussed, and uses them to create a risk score that is used to drive mitigating actions that are appropriate and proportional to the risk represented.

These knowledge sources include information about the customer (such as is available in the public record), information about the relationship that the customer has with Company personnel (such as their like/dislike of the Sales Manager, past relationships, whether they were "early adaptors" of Company products), and the number, age, and severity of problems encountered and how quickly they are resolved. The intersection of these knowledge streams represents a well of information that can be used to highlight the need to take action.

Figure 4:
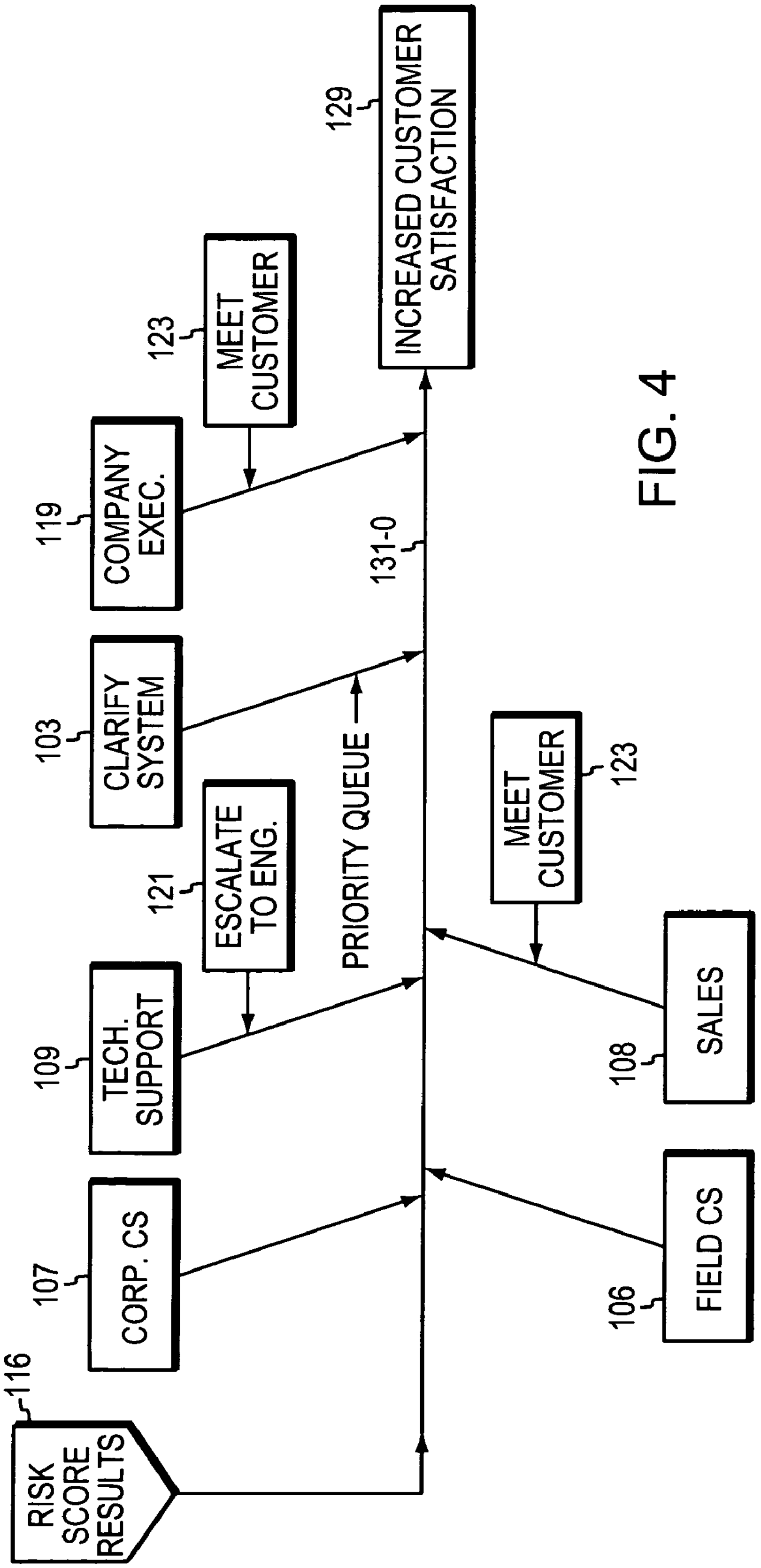
FIG. 4 is a block diagram of a methodology of responding to an output of the program logic of FIGS. 1 and 3.

The CEMS architecture 100 including the logic 112 consolidates information from all potential sources (multiple support centers, engineering groups, local account teams, etc.) so that there is an integrated picture of customer health and happiness that is used for handling errors. The inputs are collected on a variable schedule that may be related to several factors. For example, baseline data on customer market share, Fortune ranking, past relationship with Company may be updated yearly (or at lesser frequency). Data on customer trouble calls, breaking customer news, etc. may be entered real-time. With data in the system, a risk score is calculated and may be compared to predefined alarm points to drive the appropriate actions FIG. 4 shows an overview of how the risk score results 116 once derived by logic 112 are used. Some of the resources that may be brought to bear and the potential responses to the Risk rating 116 are shown on the response drawing. The resources include Field and Corporate Customer Service personnel 106-107, local Sales team 108, Corporate Technical Support 109 with escalation to Engineering resources shown in block 121 if needed. Responses may include an action to meet customer 123 by sales 108 or a company executive 119. Responses may also included notes in call handling systems such as the clarify system 103 to highlight that the customer is in a sensitive state for increased monitoring. Responses are shown along path 131-0 and are handled in accordance with a priority queue fashioned with consideration of the risk score results 116 and leading to the action of increased customer satisfaction 129.

Figure 5:
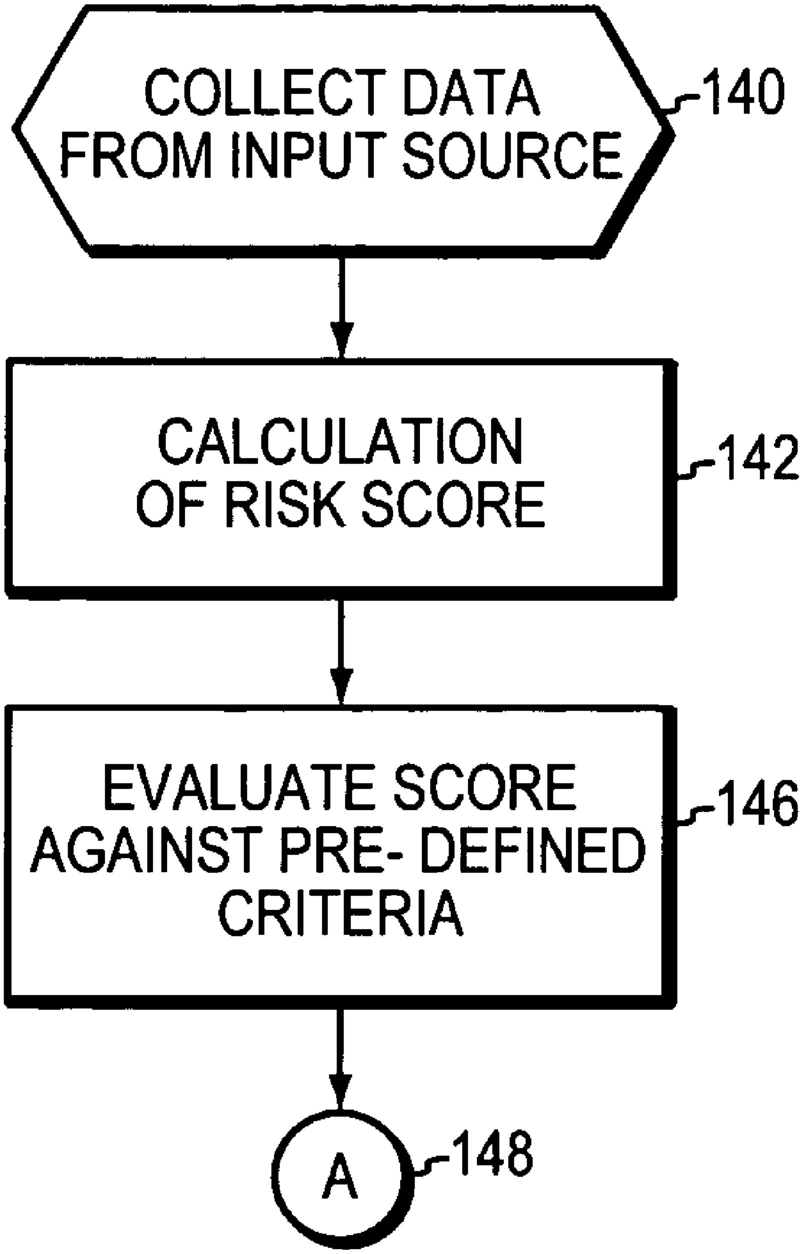
FIG. 5 is another flow logic diagram of a method of using the program logic of FIGS. 1 and 3.
Figure 6:
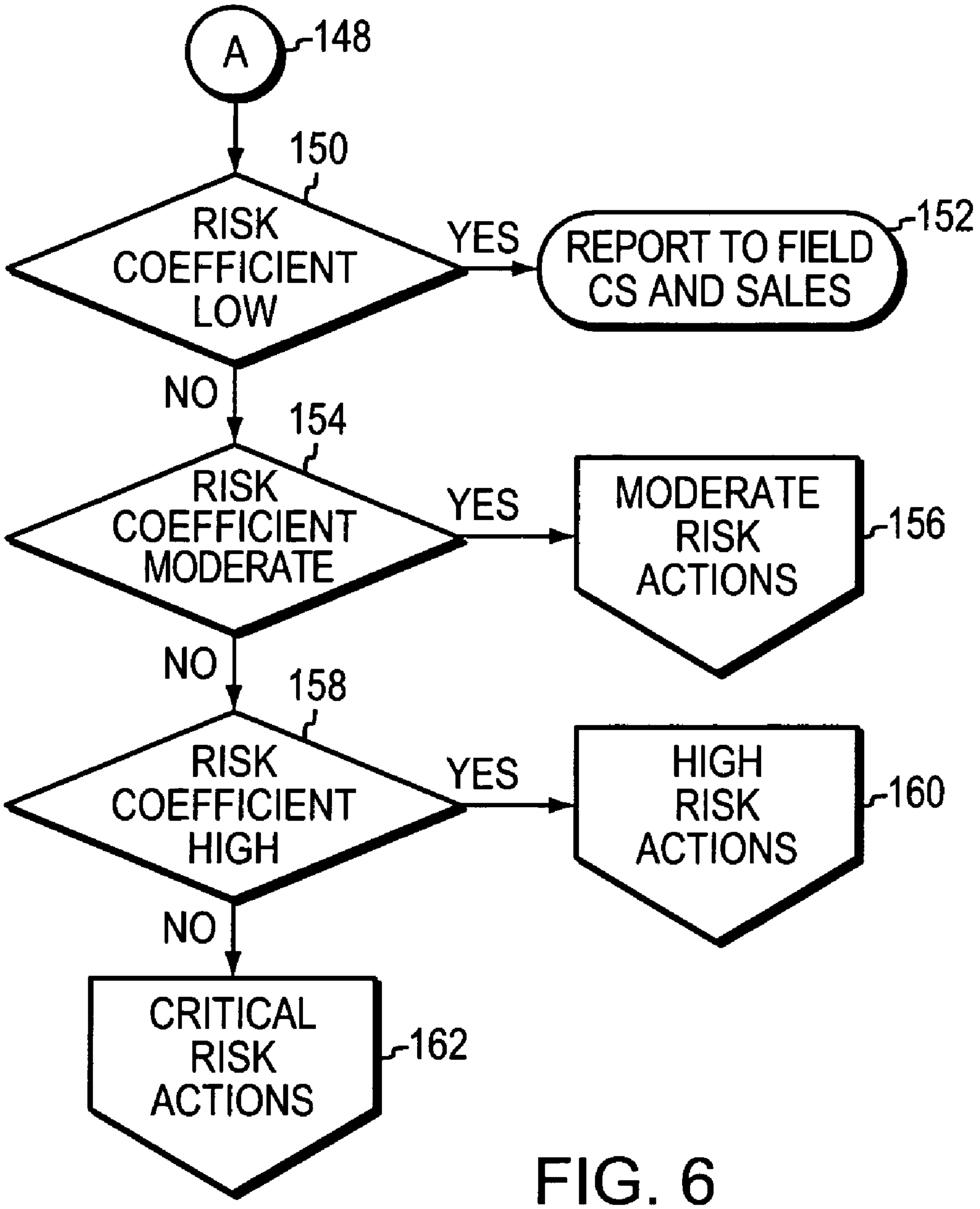
FIG. 6 is a continuation of the flow logic diagram of FIG. 5.

A basic overview of a method of using the risk score is shown in FIGS. 5 and 6. Data is collected from input source in step 140. The risk score is calculated in step 142. The score is evaluated against pre-defined criteria in step 146. Connection module A connects step 148 from FIG. 5 to FIG. 6. Inquiry steps 150, 154, and 158, determine respectively whether the risk coefficient is low, moderated, or high, in respective order, and building to critical risk actions in step 162 if the answer to each successive query is NO. If the answer to the risk coefficient being low is YES, then step 152 is performed reporting this to Field CS and Sales. If the answer is YES to the question in step 154 then moderate risk actions are taken in step 156. Moderate risk actions are described with reference to FIG. 7. If the answer is YES to the question in step 158 then high risk actions are taken in step 160. High risk actions are described with reference to FIG. 8. Critical Risk Actions are described with reference to FIG. 9.

Generally, data is collected and processed as described above and the system logic reports the associated risk as "Low," "Moderate," "High," and "Critical." These categories may be roughly assigned to represent a risk to Company's business as follows (examples are general only and are not meant to proscribe the breadth of available information/knowledge):

Low—customer is 'happy' with company's products, services and personnel. No trouble currently reported and the rate of trouble calls in the past is low. Customer may be relatively small business entity with low current and potential EMC Sales opportunities. Customer is generally enthusiastic about EMC products, etc.

Moderate—customer may be larger entity with current Sales, or potential for Sales. May be early adaptor or have special relationship to Company, perhaps has been a customer since early in the company's history. Some current problems with product, etc. CSAT (Customer Satisfaction) surveys may show 'middle of the road' responses.

High—Customer is having problems with Company's product, current and future sales in jeopardy, large (possibly multi-national) company.

Critical—Company critical customer account (top 20%), with multiple recent and on-going issues, significant data-loss situations, large potential sales, etc.

Referring to FIG. 6, in Step 152, if the risk score for a customer is "Low", a report of this condition is created and supplied to the local account team (and interconnected account teams for large companies) to keep them informed of the customer state. A change in the score from the previous report is also provided to show if there is a potential for the customer to slip into a more critical category.

Figure 7:
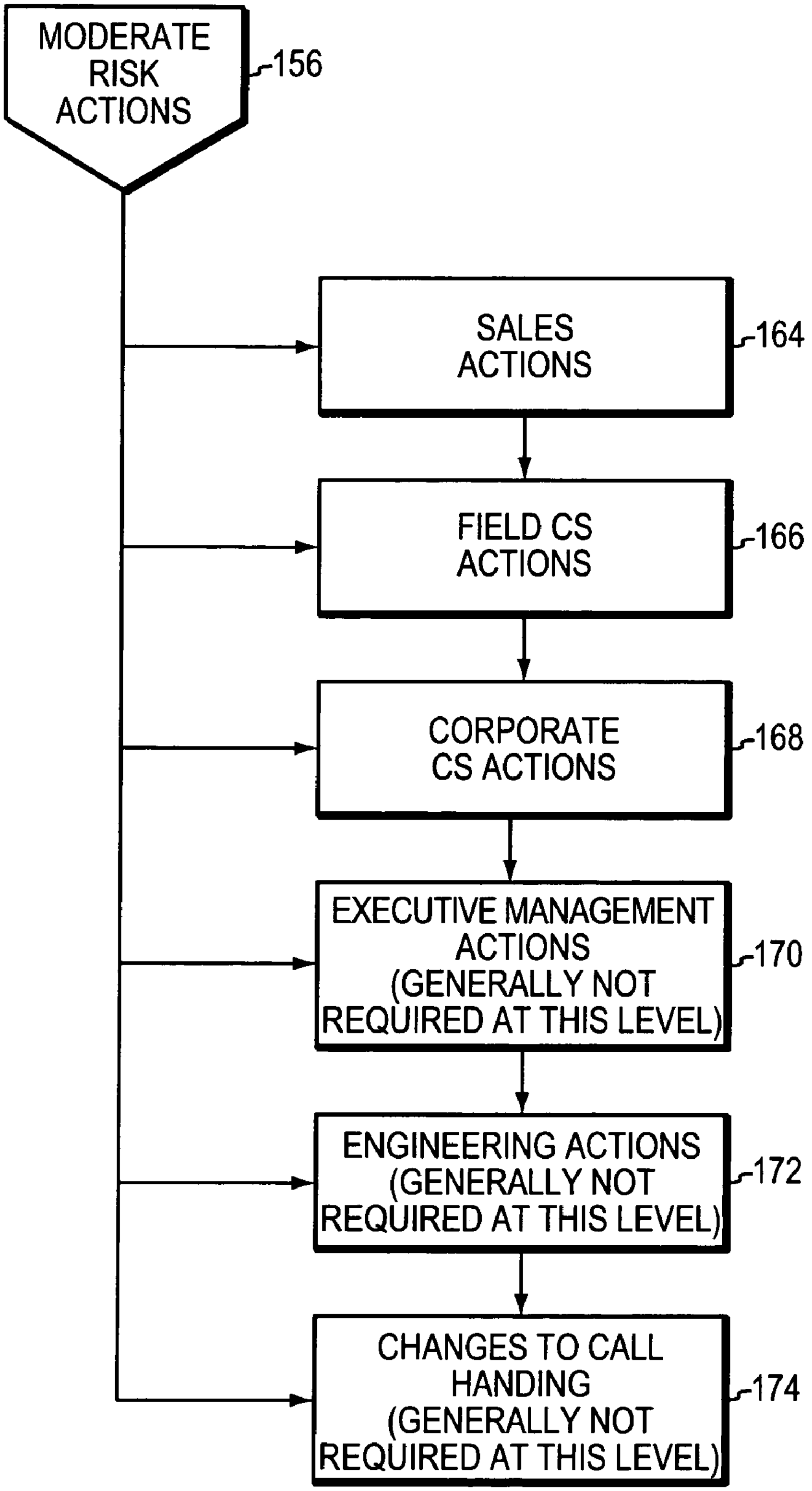
FIG. 7 is a flow logic diagram of a method responding to a condition referenced in FIGS. 5 and 6.

Referring to FIG. 7, if the customer score is "Moderate-Risk," in step 156 then a report is provided to the local team alerting them to the state on the next business day. At this point, the local Sales or CS account team or teams (Steps 164, 166, and 168) may take the opportunity to mitigate the risk by visiting the customer, supplying additional technical resources on-site, or taking other actions that will help to bring the customer risk rating to a lower level. Usually at this level Executive Management Actions (Step 170), Engineering Actions (Step 172), and/or Changes to Call handling procedures (Step 174) are not needed.

Figure 8:
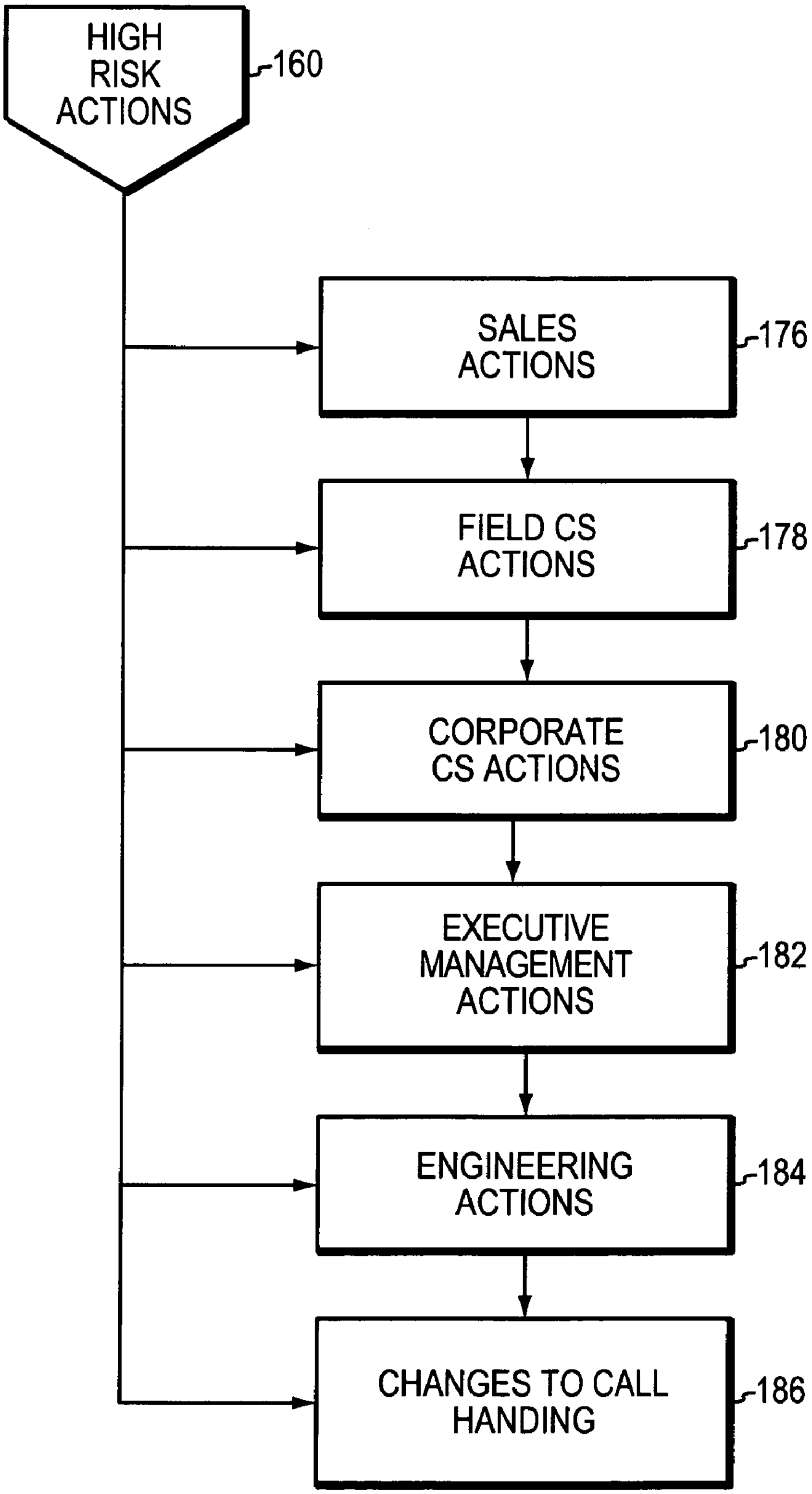
FIG. 8 is another flow logic diagram of a method responding to a condition referenced in FIGS. 5 and 6.

Referring to FIG. 8, if the customer score is "High-Risk," in step 160 then a report is provided to the local team alerting them to the state immediately. At this point, the local Sales or CS account team (Steps 176, 178, and 180) may take the opportunity to mitigate the risk by visiting the customer, supplying additional technical resources on-site, or taking other actions that will help to bring the customer risk rating to a lower level. Corporate technical and management resources may be brought to bear to resolve on-going issues and keep the customer informed of progress (Steps 182 and 184). Failure to mitigate the immediate circumstances that drove the customer to High Risk are escalated in accordance with established procedures, and changes to call handling may be needed (Step 186).

Figure 9:
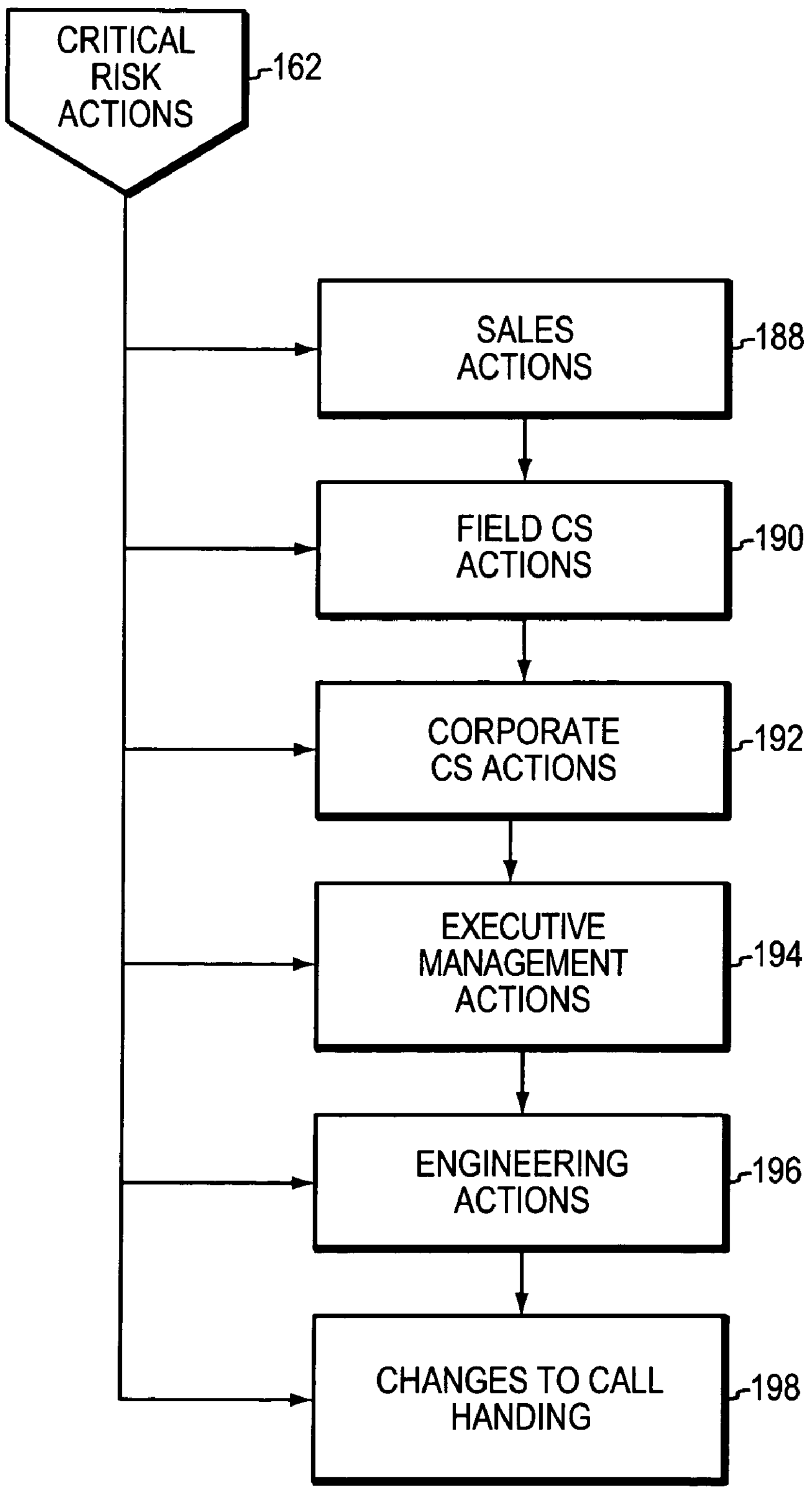
FIG. 9 is another flow logic diagram of a method responding to a condition referenced in FIGS. 5 and 6.

Referring to FIG. 9, if the customer score is "Critical-Risk," then a report is provided to the local team alerting them to the state immediately. In addition, Company Executive management may be notified via email, voice mail, etc. to inform them of the situation and driving forces. At this point, the local Sales or CS account team will have taken actions to mitigate the risk by visiting the customer, supplying additional technical resources on-site, or taking other actions that will help to bring the customer risk rating to a lower level (Steps 188, 190, and 194). Corporate resources are fully engaged and follow-up visits by Executive Management, Engineering, etc. may be scheduled to reduce the risk (Steps 194 and 196). Call handling systems may be modified to place the customer in line for expedited service (Step 198).

Generally, Risk coefficient is derived by weighting inputs and summing to give a final overall score for the customer. For example, a customer that has not experienced any trouble calls in the last six months might get a score of 1 for "trouble Calls" where a customer that experienced 1/week over the last six months may get a 10. The inventor recognizes that the model will be subject to refinement and can be modified with experience and as a database is built of error handling using the architecture 100 with logic 112. It is a good choice to build a model in a spreadsheet fashion initially.

An example of using data to feed as input 37 to logic 112 to arrive at a risk score result 116 is now given. One skilled in the art will recognize that the example does not limit the breadth of applicability of this invention but is put forth here to illustrate a way of using a particular embodiment of the invention. An example of calculating a customer risk coefficient calculation is now given.

For example, referring to Equation 1 below: Risk=Rc+Rs+Rf+Rt (Equation 1)

Where:

Risk=Raw Risk Score

Rc=Customer Risk Coefficient component

Rs=Sales Risk Coefficient Component

Rf=Field Customer Service Risk Coefficient Component

Rt=Trouble Call Risk Coefficient Component

Given the following information (see coefficient tables at end):

Customer Inputs:

Customer Fortune Rank: 400

Time as Customer of Company: 6 years

Last Customer Satisfaction (CSAT) Survey Results: 2

Industry Segment: B (Company choice)

Sales Input

Current Sales with Company—$200K

Projected Sales with Company—$500K

Field CS Input:

Product Type/Install Base: HW/100, SW/50, Services/50

Trouble Call Input:

Last Severity 1 Event Date: Dec. 15, 2004 (assume current date=12/17/2004)

umber events in last 7 days: 10

Number events in last 30 days: 15

Number events in last 60 days: 100

Number events in last 90 days: 150

Total lifetime customer events: 1000

Total open days (currently open cases): 100

Then, from Equation 1: Risk=Rc+Rs+Rf+Rt, and substituting numbers Risk=(5+5+15+5)+(5+20)+(20+30+12)+(15+1+1+1+1+1+20) or Risk=157. If the largest total score for this class of example was determined to be 420, i.e. the then the proportional risk score for the customer is: Risk(p)=157/420=0.38

From the following Table 1, Risk levels are assumed to be assigned as follows:

TABLE 1

| Proportional Risk Score | Risk "Level" |
|---|---|
| 0-0.25 | Low |
| 0.26-0.50 | Moderate |
| 0.51-0.75 | High |
| 0.76-1.00 | Critical |

In this example, the customer risk level is "Moderate" which would cause the initiation of "Moderate" Risk Actions as shown on FIGS. 6 and 7. For instance, Field CS may initiate a customer visit; Corporate CS may insure that the customer is given expedited call handling.

Risk coefficient can be calculated by taking predefined ratings as show in the following tables 2-15 (Coefficient values for example only). However, these are examples and not intended to limit the invention, which should only be limited by the claims appearing below and their equivalents:

TABLE 2

| | | | | | |
|---|---|---|---|---|---|
| Fortune Ranking | 500-401 | 400-301 | 300-201 | 200-101 | 100-1 |
| Coefficient | 1 | 5 | 10 | 15 | 20 |

TABLE 3

| | | | | | |
|---|---|---|---|---|---|
| Company Years | 0-5 | 6-10 | 11-15 | 16-20 | >20 |
| Coefficient | 1 | 5 | 10 | 15 | 20 |

TABLE 4

| | | | | | |
|---|---|---|---|---|---|
| CSAT Survey | 5 | 4 | 3 | 2 | 1 |
| Coefficient | 1 | 5 | 10 | 15 | 20 |

TABLE 5

| | | | | | |
|---|---|---|---|---|---|
| Industry Segment | A | B | C | D | E |
| Coefficient | 1 | 5 | 10 | 15 | 20 |

TABLE 6

| | | | | | |
|---|---|---|---|---|---|
| Current Sales (k$) | 0-100 | 101-200 | 201-300 | 301-400 | >400 |
| Coefficient | 1 | 5 | 10 | 15 | 20 |

TABLE 7

| | | | | | |
|---|---|---|---|---|---|
| Projected Sales (k$) | 0-100 | 101-200 | 201-300 | 301-400 | >400 |
| Coefficient | 1 | 5 | 10 | 15 | 20 |

TABLE 8

| | | | |
|---|---|---|---|
| Install Base | Hardware | Software | Services |
| Coefficient | 20 | 30 | 12 |

TABLE 9

| | | | | | |
|---|---|---|---|---|---|
| Days since last event | >4 | 4 | 3 | 2 | 1 |
| Coefficient | 1 | 5 | 10 | 15 | 20 |

TABLE 10

| | | | | | |
|---|---|---|---|---|---|
| Number in last 7 days | 0-10 | 11-15 | 16-20 | 21-25 | >25 |
| Coefficient | 1 | 5 | 10 | 15 | 20 |

TABLE 11

| | | | | | |
|---|---|---|---|---|---|
| Number in last 30 days | 0-25 | 26-50 | 51-75 | 76-100 | >100 |
| Coefficient | 1 | 5 | 10 | 15 | 20 |

TABLE 12

| | | | | | |
|---|---|---|---|---|---|
| Number in last 60 days | 0-100 | 101-200 | 201-300 | 310-400 | >400 |
| Coefficient | 1 | 5 | 10 | 15 | 20 |

TABLE 13

| | | | | | |
|---|---|---|---|---|---|
| Number in last 90 days | 0-500 | 501-1000 | 1001-1500 | 1501-2000 | >2000 |
| Coefficient | 1 | 5 | 10 | 15 | 20 |

TABLE 14

| | | | | | |
|---|---|---|---|---|---|
| Total Lifetime Events | 0-1000 | 1001-2000 | 2001-3000 | 3001-4000 | >4000 |
| Coefficient | 1 | 5 | 10 | 15 | 20 |

TABLE 15

| | | | | | |
|---|---|---|---|---|---|
| Total days open | 0-10 | 11-15 | 16-20 | 21-25 | >25 |
| Coefficient | 1 | 5 | 10 | 15 | 20 |

A system and method has been described for handling errors occurring in a data storage environment by using a risk score to guide the management of errors process. Having described a preferred embodiment of the present invention, it may occur to skilled artisans to incorporate these concepts into other embodiments. Nevertheless, this invention should not be limited to the disclosed embodiment, but rather only by the spirit and scope of the following claims and their equivalents.

What is claimed is:

1. A method for handling one or more errors in a data storage environment including a data storage system, the method comprising the steps of:

responding to an error in the data storage environment by using program logic to score error-related risk and using this risk score to manage a process for resolving the error and the risk score is derived from integrating inputs that include information from public records about a customer that is experiencing the error, information reports from a company responsible for resolving the error that are related to the company's relationship with the customer, and input from the computer system that reports the error that is directly related to the error itself.

2. The method of claim 1, wherein the error is with the data storage system.

3. The method of claim 1, wherein the environment includes a file server and the error is with the file server.

4. The method of claim 1, wherein the environment includes data storage management software and the error is with the data storage management software.

5. The architecture of claim 1, wherein the risk score is calculated by using a risk coefficient assigned to information related to the customer in accordance with predetermined criteria.

6. A system for handling one or more errors in a data storage environment, the system comprising:

a data storage system;

data storage management software for managing the data storage system;

computer-executable program logic in communication with the data storage system and the data storage software for responding to an error in the data storage environment, wherein the program logic scores error-related risk and uses this risk score to manage a process for resolving the error and the risk score is derived from integrating inputs that include information from public records about a customer that is experiencing the error, information reports from a company responsible for resolving the error that are related to the company's relationship with the customer, and input from the computer system that reports the error that is directly related to the error itself.

7. The system of claim 6, wherein the error is with the data storage system.

8. The system of claim 6, wherein the environment includes a file server and the error is with the file server.

9. The system of claim 6, wherein the error is with the data storage management software.

10. The system of claim 6, wherein the risk score is calculated by using a risk coefficient assigned to information related to the customer in accordance with predetermined criteria.

11. A Computer Program Product for handling one or more errors in a data storage environment including a data storage system, the Program Product comprising:

a computer-readable storage medium having program logic encoded thereon enabling the computer-execution of the steps of:

responding to an error in the data storage environment by using program logic to score error-related risk and using this risk score to manage a process for resolving the error and the risk score is derived from integrating inputs that include information from public records about a customer that is experiencing the error information reports from a company responsible for resolving the error that are related to the company's relationship with the customer, and input from the computer system that reports the error that is directly related to the error itself.

* * * * *